3,296,223
VULCANIZATION OF CHLOROPRENE POLYMERS USING A MIXTURE OF A THIOACETAMIDE AND A GUANIDINE
James Richard Wolfe, Jr., Wilmington, Del., assignor to E. I. du Pont de Nemours and Company, Wilmington, Del., a corporation of Delaware
No Drawing. Filed Nov. 10, 1961, Ser. No. 151,447
2 Claims. (Cl. 260—79.5)

This invention is directed to an improved vulcanization accelerator and process of using same for the vulcanization of chloroprene polymers wherein the accelerator for vulcanization comprises a mixture of (I) N-butyl-1,-(1-butyl-5-thioxo-2-pyrrolidyl)thioacetamide and (II) a diarylguanidine.

Various N-substituted thiocarboxamides are known to be vulcanization accelerators for chloroprene polymers, particularly when preparing an article from the latex. See, for example, the disclosure of U.S. Patent 2,852,498. A particularly effective accelerator, prepared by the general procedure described in U.S. Patent 2,280,578, has been identified as N-butyl-1-(1-butyl-5-thioxo-2-pyrrolidyl)thioacetamide having the following structure:

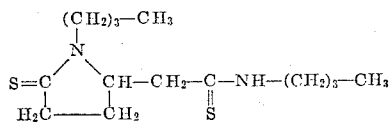

It has been found that while N-butyl-1-(1-butyl-5-thioxo-2-pyrrolidyl)thioacetamide may be used alone in producing vulcanized chloroprene polymers having satisfactory properties, vulcanizates having even better tensile properties may be prepared when a composition comprising a blend of a diarylguanidine with the above compound is used as the vulcanization accelerator.

It is therefore an object of this invention to provide an improved process for the vulcanization of chloroprene polymers. It is also an object of this invention to provide new compositions to be used in the vulcanization of chloroprene polymers. More particularly, it is an object of this invention to provide vulcanization accelerator compositions which are useful in the rapid curing at relatively low temperatures of articles made from polychloroprene latex.

These and other objects will become apparent in the following description and claims.

More particularly, the present invention is directed to a vulcanization accelerator for chloroprene polymers, in which accelerator the active component comprises (I) 1 part by weight of N-butyl-1-(1-butyl-5-thioxo-2-pyrrolidyl)thioacetamide and (II) 0.2 to 5 parts by weight of a 1,3-diarylguanidine in which the aryl radical is phenyl or o-tolyl.

This invention includes the process of vulcanizing chloroprene polymers in the presence of vulcanizing agents wherein the improvement comprises incorporating, before vulcanization, (I) 0.2 to 5 parts of N-butyl-1-(1-butyl-5-thioxo-2-pyrrolidyl)thioacetamide and (II) 0.2 to 5 parts of a diarylguanidine in which the aryl radical is phenyl or o-tolyl, all parts being by weight per 100 parts of chloroprene polymer, the proportion by weight of (I) to (II) being in the range of 1 part of component I to 0.2 to 5 parts of component II.

Polymers of chloroprene (2-chloro-1,3-butadiene) and copolymers of chloroprene with other monomers containing the $CH_2=C<$ group, such as acrylonitrile, 1,3-butadiene, isoprene, 2,3-dichloro-1,3-butadiene, and styrene, which copolymers consist of at least 40 percent by weight of chloroprene units, are a well-known class of elastomeric compounds usually designated as neoprene. These polymers and copolymers are usually made by polymerizing the monomeric starting material in aqueous emulsion. They are available commercially both in latex form and as solid polymers. The vulcanization accelerator compositions of this invention are particularly advantageous when used in curing films and other particles prepared from chloroprene polymer latices where-in the polymerization has been carried out in the presence of sulfur as a modifier. The chloroprene polymers and their preparation are described in numerous references. See, for example, Whitby, "Synthetic Rubber," New York, John Wiley and Sons, 1954, pages 767–793, and references cited in this article.

N-butyl - 1-(1-butyl - 5-thioxo - 2-pyrrolidyl)thioacetamide is made by reacting 1,4-dicyano-1-butene, n-butylamine, and hydrogen sulfide at about 250 to 500 p.s.i.g. and 90–100° C. Processes of this type are disclosed in U.S. Patent 2,280,578.

The vulcanizing agent used in vulcanizing the chloroprene copolymers is usually a metal oxide such as zinc oxide, magnesium oxide, or litharge. Zinc oxide is the metal oxide most often used and a mixture of zinc oxide and magnesium oxide is frequently used. Sulfur is sometimes added in addition to metal oxides but it is not essential. The customary antioxidants, fillers, peptizing agents, colors, and other conventional processing agents may be added to the polychloroprene stocks to be vulcanized in accordance with this invention.

The vulcanizing compositions of this invention may be added to a compounded polychloroprene latex by conventional techniques which are within the scope of those skilled in the art. The ingredients of the vulcanizing composition may be added separately to the polychloroprene composition or may be mixed in advance. If desired, they may be mixed in advance with other compounding ingredients such as fillers, metal oxides, etc. The vulcanization accelerator compositions of this invention may, if desired, be used in vulcanizing dry chloroprene polymers.

The proportion, by weight, of the diarylguanidine (component II) to N-butyl-1-(1-butyl-5-thioxo-2-pyrrolidyl)thioacetamide (component I) should be in the range of 0.2 to 5 parts of component II to 1 part of component I. At least 0.2 part of component II per part of component I is required to produce a significant effect on the tensile properties of the vulcanized chloroprene polymer. There is no advantage in using more than 5 parts of component II to 1 part of component I. It is usually preferred to use 0.3 to 1 part of component II to 1 part of component I. The mixture or individual components should be added to the chloroprene polymer in such a proportion that there is at least 0.2 part of each component present and no more than 5 parts of each component present, by weight, per 100 parts of polymer solids. Less than 0.2 part by weight of each ingredient will not produce satisfactory cures and more than 5 parts of each ingredient is not required and is wasteful of materials. Within these limits, the proportion of component I to component II may be varied as previously explained.

Any vulcanization temperature may be used. When latex films are being vulcanized, temperatures of about 100 to 140° C. are preferred. The time of heating is usually 15 to 60 minutes. In vulcanizing isolated polymers, the vulcanization may be carried out from 120° C. to 200° C., perferably 140° C. to 175° C. Vulcanization may be carried out in molds under pressure, or the shaped articles may be heated with steam or hot air or treated in a hot liquid bath. The accelerators may also be used in cements.

The vulcanization accelerators of this invention are particularly suitable for use in fabrication of articles from polychloroprene latices. Articles may be prepared by conventional dipping techniques such as described in Cook and Fitch, "Neoprene Dipped Goods, Rubber Chemicals Division, E. I. du Pont de Nemours and Co., Report No. 52–3, December 1952. Alternatively, the compounded latex may be coagulated and processing into slabs or pellets or other forms suitable for molding operations.

The use of the accelerator composition of this invention makes it possible to prepare rapid curing polychloroprene films which, when cured, have exceptionally good tensile properties.

Representative examples illustrating the present invention follow.

EXAMPLE 1

A latex is prepared as described in Example III of U.S. Patent 2,417,034 using a catalyst comprising potassium persulfate and potassium ferricyanide. Conversion is carried to 95–100 percent.

The latex is compounded using the following recipe:

|   | Parts by weight |
|---|---|
| Polychloroprene latex solids | 100 |
| 2,2'-methylenebis(6-tert-butyl-p-cresol) | 2 |
| 33% aqueous solution of the sodium salt of sulfated methyl oleate | 3 |
| Zinc oxide | 5 |
| Clay | 10 |
| Accelerator composition | As shown |

Diphenylguanidine is added in the form of a dispersion made by ball-milling 100 parts with 30 parts of a 10 percent aqueous solution of ammonium caseinate and 30 parts of a 10 percent aqueous solution of the sodium salt of a condensation product of formaldehyde and naphthalenesulfonic acid, and 140 parts of water. N-butyl-1-(1-butyl-5-thioxo-2-pyrrolidyl)thioacetamide is added as an emulsion containing 100 parts of this material, 80 parts of a 10 percent aqueous solution ammonium caseinate, 2 parts of a 10 percent aqueous solution of sodium lauryl sulfate, 7.5 parts of a 28 percent aqueous solution of ammonia, and 10 parts of water.

Essentially equivalent results are obtained when the diarylguanidine is mixed in advance with the other additive and the mixture is dispersed before addition to the latex.

For testing, dipped films are prepared from the compounded latex by the following method: a form is immersed in an acetone-methanol solution of calcium chloride and calcium nitrate. The form is withdrawn from the coagulant and immersed in the compounded latex for 5 minutes. The form containing the coagulated latex is withdrawn from the latex and again immersed in the coagulant for a period of 10 seconds. The coagulated film is leached in water for 4 hours and dried in a hot air oven for 2 hours at 70° C. and is then cured as specified in Table I. The films are tested by ASTM Method D412–51T.

In the tables shown in the various examples, the following abbreviations have been used.

$M_{300}$—Modulus at 300% elongation, p.s.i.
$M_{600}$—Modulus at 600% elongation, p.s.i.
$T_B$—Tensile strength at the break, p.s.i.
$E_B$—elongation at the break, percent.

TABLE I

| Accelerator | Parts by Weight | | | |
|---|---|---|---|---|
|   | A | B | C | D |
| N-Butyl-1-(1-butyl-5-thioxo-2-pyrrolidyl)thioacetamide | 1 | 1 | 2 | 0.5 |
| Diphenylguanidine |   | 2 | 2 | 1 |
| After Curing for 15 Min. at 100° C.: |   |   |   |   |
| $M_{300}$ | 375 | 300 | 350 | 300 |
| $M_{600}$ | 1,200 | 1,000 | 1,000 | 800 |
| $T_B$ | 2,300 | 3,300 | 3,200 | 2,600 |
| $E_B$ | 730 | 860 | 820 | 880 |
| After curing for 60 Min. at 100° C.: |   |   |   |   |
| $M_{300}$ | 400 | 350 | 400 | 300 |
| $M_{600}$ | 1,500 | 1,300 | 1,700 | 900 |
| $T_B$ | 2,300 | 3,300 | 2,700 | 2,900 |
| $E_B$ | 690 | 780 | 690 | 810 |

EXAMPLE 2

This example is carried out in the same way as was Example 1 except that both diphenylguanidine and di-o-tolylguanidine are used in separate experiments. The amount used and results are shown in Table II.

TABLE II

| Accelerator | Parts by Weight | | |
|---|---|---|---|
|   | A | B | C |
| N-Butyl-1-(1-butyl-2-thioxo-2-pyrrolidyl)thioacetamide | 1 | 1 | 1 |
| Diphenylguanidine |   | 1 |   |
| Di-o-tolylguanidine |   |   | 1 |
| After curing for 15 min. at 100° C.: |   |   |   |
| $M_{300}$ | 350 | 350 | 325 |
| $T_B$ | 2,500 | 2,800 | 3,200 |
| $E_B$ | 830 | 850 | 860 |
| After curing for 60 min. at 100° C.: |   |   |   |
| $M_{300}$ | 375 | 375 | 350 |
| $T_B$ | 2,500 | 3,000 | 3,400 |
| $E_B$ | 800 | 820 | 870 |

EXAMPLE 3

*Preparation of N-butyl-1-(1-butyl-5-thioxo-2-pyrrolidyl)-thioacetamide*

A mixture of 146 parts of 1,4-dicyano-1-butene and 240 parts of n-butylamine are placed in a Hastalloy autoclave. The autoclave is then charged with 185 parts of hydrogen sulfide. The contents of the autoclave are stirred and heated for 8 hours at 100° C. The product mixture is diluted with benzene and the benzene mixture is filtered to remove solids. The filtrate is washed twice with dilute hydrochloric acid. The organic solution is steam distilled. The residue of the steam distillation is dried to give 356 parts of product. The product is a dark viscous liquid.

Calc'd for $C_{14}H_{26}N_2S_2$: C, 58.69; H, 9.15; N, 9.78; S, 22.38; mol. wt. 286.5. Found: C, 58.1, 58.1; H, 8.8, 9.0; N, 9.76, 9.59; S, 22.6, 22.9; mol. wt. (acetone) 284, 284.

The integrated nuclear magnetic resonance spectrum of the product indicates a ratio for hydrogen atoms on nitrogen to all other hydrogen atoms in the molecule of approximately 29 to 1. The analytical results and spectra are in accord with the structure assigned to the product, N-butyl-1-(1-butyl-5-thioxo-2-pyrrolidyl)thioacetamide.

The preceding representative examples may be varied within the scope of the present total specification disclosure as understood and practiced by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A vulcanization accelerator for chloroprene polymers which improves the tensile properties, in which accelerator the active component comprises (I) 1 part by weight of N-butyl-1-(1-butyl-5-thioxo-2-pyrrolidyl)thioacetamide and (II) 0.2 to 5 parts by weight of a 1,3-diarylguanidine in which the aryl radical is selected from the group consisting of phenyl and o-tolyl.

2. In a process for vulcanizing chloroprene polymers in the presence of about 0.2 to 5 parts of N-butyl-1-(1-butyl-5-thioxo-2-pyrrolidyl)thioacetamide per 100 parts of chloroprene polymer, the improvement of increasing the tensile strength by the incorporation into said polymer before vulcanization of 0.2 to 5 parts of a diarylguanidine, per part of N-butyl-1-(1-butyl-5-thioxo-2-pyrrolidyl) thioacetamide, in which diarylguanidine the aryl radical is selected from the group consisting of phenyl and tolyl.

References Cited by the Examiner

UNITED STATES PATENTS 2,280,578   4/1942   Hanford et al. _____ 260—551

OTHER REFERENCES

Whitby: "Synthetic Rubber," page 776, 1954 (copy in Scientific Library).

LEON J. BERCOVITZ, *Primary Examiner.*

J. A. KOLASCH, *Assistant Examiner.*